Patented Jan. 3, 1928.

1,655,045

UNITED STATES PATENT OFFICE.

WALTER O. BORCHERDT, OF AUSTINVILLE, VIRGINIA, ASSIGNOR TO THE NEW JERSEY ZINC COMPANY, OF NEW YORK, N. Y., A CORPORATION OF NEW JERSEY.

DEFLOCCULATION OF COLLOIDS.

No Drawing.   Application filed April 1, 1925.   Serial No. 20,012.

This invention relates to the art of effecting the suspension of finely divided solids in a liquid and more particularly to the deflocculation of colloidal matter. The invention has for its object the provision of certain improvements for promoting the suspension of finely divided solids in a liquid medium or for promoting the deflocculation of colloidal matter.

Throughout this specification and the appended claims, I intend to embrace in the expressions "colloids", "colloidal matter" and "colloidal constituents" both true colloids and quasi or borderland substances which may not be truly colloidal but partake of the qualities of, or resemble, colloids, and without regard to the sources from which such colloidal matters are derived. Thus, for the purposes of the present invention, the colloidal constituents may be considered as ranging from just above the molecular size upward through the class of so-called suspensoids, which, while possibly not true colloids, still, because of their relatively large specific surface, exhibit some, if not all, of the properties of colloids, and are capable of existing in both the sol or gel state, or of being dispersed and coagulated or flocculated and deflocculated. By colloidal matter, therefore, I mean material which is not necessarily a true colloid, but which exhibits colloidal characteristics to a sufficient degree to make it amenable to the manipulation hereinafter described.

In the ore-dressing, clay-working, chemical and allied industries, materials are customarily treated which consist of mixtures of more or less finely divided solid particles with a liquid medium, commonly water, to form pastes or pulps. Such mixtures of finely divided solid particles and liquid usually contain colloidal matters and it is often essential to control the amount or condition, or both, of such colloidal constituents. In some cases, the problem presented is that of the removal to a desired degree of the colloidal from the non-colloidal or granular constituents. In other cases, it is required to change the state in which the colloidal constituents exist, in order thereby to secure a desired alteration in the properties of the mixture.

The colloidal constituents of such mixtures of finely divided solid particles with a liquid are rarely, if ever, naturally deflocculated and dispersed to their maximum possible extent. Since aggregated or flocculated colloidal matters act in some cases like solid particles of greater magnitude and in other cases display characteristics different from those which they possess when completely dispersed or deflocculated, it is often necessary, in order to effect either the removal of such colloidal constituents from the mixture or the desired alteration in the properties of the mixture, to bring about the more or less complete deflocculation or dispersion of such colloidal constituents.

The agencies which promote the flocculation of the colloidal constituents also in general seem to promote the adsorption or other form of attachment which exists between such colloidal constituents and the granular constituents of the mixture. It follows, therefore, that when the colloidal constituents have been thoroughly deflocculated and minutely dispersed, they no longer exist in the form of aggregates resembling the coarser solid particles of the mixture but behave more like substances in solution and are in fact spoken of as being in colloidal solution, and as, at the same time, their adsorption or other bond for the coarser solid particles may have been weakened, the removal of such colloidal constituents from the mixture is greatly facilitated over what is possible in their natural partially flocculated condition; or their change in condition alters the properties of the mixture.

Even when the colloidal constituents of a mixture are originally deflocculated or have been deflocculated in a previous treatment step, they may have become flocculated during the subsequent treatment, or agents may have been added which cause them to flocculate, and in such cases, the same general method of treatment is applied to secure deflocculation in accordance with the principles of this invention as would be applied to a mixture containing naturally flocculated colloidal constituents.

Since the principles of the present invention are applicable to the treatment of many kinds of mixtures of finely divided particulate matter with a liquid to form a paste or pulp, I wish to be understood when referring to "pulps" or "pastes" as including in these terms mixtures of natural or artificial particulate matters with a liquid, and, therefore, comprehending ores, tailings, middlings, smeltery slags, flue dusts, fumes, furnace products, manufactured materials, foundry or factory sweepings or similar débris, coal, coke, clay, sand, gravel, concrete aggregate, rock crushed for agricultural purposes or for fertilizer manufacture, oil-shale, oil-rock, oil-sand, etc., when mixed with a liquid to form a paste or pulp.

The word "mineral," as herein used, is to be understood as including inorganic substances of substantially constant chemical composition occurring naturally in the crust of the earth; such inorganic but artificial substances analogous in structure and use to natural minerals, and which, by extension of thought are in practice classed as minerals, and also such substances found in the earth as are organic in the sense that they are supposed to owe their origin to the plant or animal life of past geological ages, but are now classed as mineral. It will therefore be understood that I intend to include in the word "mineral" not only the well recognized natural minerals, metallic and non-metallic, but also metals, elements, smeltery slags, refractory materials, abrasive substances, glass, ashes, flue-dusts, foundry or factory sweepings or similar débris, coal, coke, clay, bitumens, petroleum oils, etc.

Treatments having for their purpose the change of condition of the colloidal constituent of a mixture in order to alter or modify the properties of the mixture and not necessarily involving removal of colloidal constituents therefrom, are frequently employed. Such treatments may be applied to pastes, containing so little liquid as to be semi-solid, or to mixtures containing so large a proportion of liquid as to be fluid or semi-fluid, in which condition they are generally spoken of as pulps. Thus, a mixture of clay with water may contain flocculated colloidal constituents and with a given water content may approximate a semi-solid and by the addition of the deflocculating agent of the present invention and the kneading, pugging, or blunging treatment commonly applied, a higher degree of fluidity may be secured without increase of the water content of the mixture. Such operations are commonly involved in the preparation of clays for brickmaking, casting, and similar purposes, as will be well understood by those skilled in the arts to which this invention relates.

For the purposes of explanation, the present invention will be particularly described as applied to the concentration of minerals, and the understanding of the invention derived from this description will enable those skilled in the art to apply successfully the principles of the invention to other mineral treatment operations.

I have discovered that the various forms of runaway extract are effective agents for promoting the suspension of finely divided solids in a liquid medium or for promoting the deflocculation of colloidal constituents in pastes or pulps. The present invention accordingly contemplates the treatment of mixtures of finely divided solids and a liquid medium with an appropriate form of runaway extract for promoting the suspension of finely divided solids in the liquid medium or for deflocculating colloidal constituents in the mixture. As applied to the removal of colloidal matter from a pulp containing the same, the invention contemplates treating the pulp with an appropriate form of runaway extract, preferably in conjunction with agitation, and thereby deflocculating the colloidal matter to a desired extent, and then removing the deflocculated colloidal matter to a desired extent from the pulp, preferably by decantation.

Runaway extract is a waste product from the tanning of leathers. I have used it in two forms, both of which represent a concentration by evaporation (probably under reduced pressure) of the original material.

Runaway extract as produced by the N. R. Allen Sons Company is a thick, dark red liquid having a density of about 1.31. It dissolves easily in water, the solution being acid to litmus. An approximate analysis of a sample of this material furnished by the manufacturer showed:

| | |
|---|---|
| Specific gravity | 1.2577 |
| Degree Tw | 51.5 |
| Moisture | 50.61% |
| Total solids | 49.39% |
| Soluble solids | 46.76% |
| Insolubles (reds) | 2.63% |
| Non-tannins | 34.71% |
| Tannin | 12.05% |
| Acid | 1.8 % |

Material of this approximate composition and character will be referred to hereinafter as Allen's runaway extract.

Another sample of runaway extract furnished by the J. K. Mosser Company is described as concentrated tanning liquor from which most of the tannin has been removed. It is a thick, dark brown liquid having a density of 1.24 to 1.26 and is acid to litmus. The manufacturer states that the original tanning liquor (of which the runaway extract represents the spent material resulting from use in tanning) contains: 20% quebracho, a South American extract; 15% hemlock and oak bark, native; 40% chestnut extract, made from chestnut wood pulp; 10% mangrove bark, a tanning material from Africa; 10% mangrove cutch, a tanning material from Africa; 5% wattle bark. This material will be referred to hereinafter as Mosser's runaway extract.

The Mosser runaway extract I have also used in a neutralized form employing sodium carbonate or soda ash at the rate of 10.5 pounds to neutralize 100 pounds of the Mosser runaway extract. This material will be referred to hereinafter as Mosser runaway extract neutralized.

Some of the substances occurring in the concentrated runaway extract are colloidal in character and it is probable that the properties of the material which determine its value in the process of the present invention result, in part at least, from the colloidal character of some of the constituents.

The Allen, Mosser and the Mosser neutralized runaway extracts have all given satisfactory results when used in the practice of the process of the present invention in appropriate quantities and under suitable conditions; both of which will be hereinafter more fully described.

In carrying out the present invention in connection with the treatment of pulps and more particularly mineral pulps, the runaway extract is added to the pulp and distributed throughout the mass thereof. The desired distribution of the runaway extract through the pulp, and the deflocculation of colloidal matter in the pulp, is promoted by rapid circulation and agitation of the pulp. Increase or decrease in temperature may also be of assistance in promoting the desired action of the runaway extract.

The necessary distribution of the runaway extract through the mass of the pulp can be very conveniently and effectively brought about by adding the runaway extract to the pulp at some point prior to the admission of the pulp to the ball or pebble mills, or other fine grinding machines which almost invariably form a part of the equipment of mineral treatment plants.

Where the pulp contains in solution in the liquid thereof substances which prevent dispersion or deflocculation of the colloids by runaway extract, such substances may be in part or in whole removed as, for example, by the removal of the liquid from the pulp and repulping with non-deleterious fresh liquid, prior to the introduction of the runaway extract, or such substances may be otherwise neutralized and rendered harmless by methods and agents which are generally known, and can be regulated by simple tests. For example, an excessive quantity of magnesium sulfate or of some other electrolyte in the mineral pulp may interfere with the proper action of runaway extract as a deflocculating agent. Such a condition may be corrected by washing the mineral for the removal of soluble salts.

When the colloidal matter in the pulp has been deflocculated to the desired extent, the deflocculated colloidal matter may be removed (by decantation or otherwise) from the pulp to the extent necessary to prevent the colloids from interfering with the subsequent treatment of the pulp, or to the extent desired for any other purpose. Such removal of the colloids in a deflocculated condition may take place in tanks such as those of the Dorr, Allen or Callow types. With the overflow from such tanks there will be removed a corresponding amount of liquid and the remaining pulp will be correspondingly thickened.

After the deflocculated colloidal matter has been removed to the desired extent (that is in whole or in part, depending upon the result desired), the remaining mineral pulp may be subjected to any appropriate treatment operation. To this end, the pulp may be further thickened or dried, or it may be diluted, depending upon the nature of the subsequent treatment operation.

Where the residual runaway extract in the remaining pulp is deleterious in a subsequent treatment operation, it may be removed, as by repulping with fresh liquid and effecting a second decantation, or by otherwise washing the pulp with fresh liquid to remove objectionable amounts of the runaway extract.

The colloidal matter separated from the pulp is commonly of a character such that it may be discarded. In case the colloidal matter is of value, it may, of course, be recovered from the accompanying liquid. The liquid accompanying the removed colloids may be separated and recovered for reuse. The colloids contained therein may thus be coagulated and settled or filtered out. The liquid thus separated from the colloids may be purified, if necessary, to free it from substances prejudicial to its subsequent reuse.

The amount of the runaway extract to be used in practicing the present invention depends upon its form (that is, its degree of concentration and other physical properties and upon its chemical composition), the nature of the pulp under treatment, the degree or character of deflocculation to be attained, the temperature, the degree of dilution of the pulp and the kind and the relative amount of colloidal matter in the pulp. Of the concentrated runaway extracts hereinbefore particularly mentioned, from 1 to 70 pounds per ton of dry solids in the pulp may be required.

As some of the runaway extracts are acid, others neutral or alkaline, I have found that by tests a suitable combination of runaway extracts and mineral pulp can generally be found which will permit of securing the desired result with a much smaller quantity of runaway extract per ton of dry material treated than is indicated by the larger figure just mentioned.

Thus, in treating a certain ore, I have found that with Allen's runaway extract an excessive quantity of the runaway extract was required per ton of dry ore to produce a deflocculation of a certain degree when the ore pulp had not been treated with agents for the precipitation of some of the soluble salts which it contained, but when the pulp had been treated with lime and sodium carbonate to precipitate certain salts, I found that seven pounds of the runaway extract per ton of dry ore gave a good deflocculation of the colloidal constitutents. Similarly, the same ore gave like results with Mosser's runaway extract, eight pounds of the latter being required per ton of dry ore to secure a good deflocculation of the colloidal constituents of the pulp after the pulp had been treated with lime and sodium carbonate. I have found other ores, especially one which had been partly roasted, which contained, when made into a pulp with water, so large a proportion of soluble salts that an excessive quantity of Allen's runaway extract per ton of dry ore gave an inferior deflocculation. This ore when washed with five weights of water to remove some of these soluble salts, gave, with the same brand of runaway extract, a good deflocculation when used at the rate of seventy pounds per ton of dry ore. This same ore, unwashed, was tested with ninety pounds of Mosser's runaway extract per ton of dry ore, but gave an inferior deflocculation, but when washed with five weights of water, sixty pounds of Mosser's runaway extract served to give an excellent deflocculation. In both these cases further washing still further reduced both the quantity of soluble salts remaining in association with the ore and the quantity of runaway extract required to secure satisfactory deflocculation, but in this particular case it was more economical to use the larger quantity of runaway extract indicated than to employ the alternative of a greater degree of washing.

On Austinville lead-zinc ore consisting of sulfides of these metals in a dolomite gangue, excellent deflocculations of the colloidal constituents of an ore pulp ground to flotation size was secured by the use of from five to six pounds per ton of dry ore of either the Allen, the Mosser, or the Mosser's neutralized runaway extract.

On still another ore which was very finely ground and contained a considerable percentage of colloidal constituents, six pounds per ton of dry ore of the Allen runaway extract or fifteen pounds per ton of dry ore of Mosser's runaway extract was required to produce a very good deflocculation.

In general I have observed that the runaway extracts when properly selected to suit a particular ore are less sensitive to the action of electrolytes than is sodium silicate. It should also be observed that the quantities of runaway extract given in the particular examples just mentioned apply to laboratory tests in which the value of the agent is measured in terms of a standard degree of deflocculation (arbitrarily chosen) for the colloids in that ore and that in practice, in dealing with the ore in the mill, it is generally sufficient to use much smaller quantities, as, for example, from 1 to 5 pounds of runaway extract per ton of ore. The reason for this is that in practicing deflocculation and decantation in a mill, the rate of treatment is adjusted to give certain economically satisfactory results without regard to whether these are the optimum which might be obtainable.

I claim:

1. The improvement in promoting the deflocculation of finely divided solids in a liquid medium which comprises treating a mixture of the finely divided solids and the liquid medium with runaway extract.

2. The improvement in promoting the deflocculation of finely divided solids in a liquid medium which comprises blunging a mixture of the finely divided solids and the liquid medium in the presence of runaway extract.

3. The improvement in promoting the suspension of finely divided solids in a liquid medium which comprises treating a pulp of the liquid medium and the finely divided solids with runaway extract.

4. The improvement in deflocculating colloidal matter which comprises treating a pulp containing the colloidal matter with runaway extract.

5. The method of removing colloidal matter from a pulp containing the same which comprises treating the pulp with runaway extract and thereby deflocculating the colloidal matter to a desired extent, and removing the deflocculated colloidal matter to a desired extent from the pulp.

6. The method of deflocculating and removing colloidal matter from a mineral pulp containing the same which comprises treating the mineral pulp with runaway extract and thereby deflocculating the colloidal matter to a desired extent, and separating the deflocculated colloidal matter from the mineral pulp by decantation.

7. The method of improving the physical condition of minerals associated with colloidal matter in a mineral pulp which comprises treating the mineral pulp with runaway extract and thereby deflocculating to a desired extent the colloidal matter in the mineral pulp, and removing the deflocculated colloidal matter to a desired extent from the mineral pulp by a decantation operation.

8. The improvement in producing the suspension of finely divided solids in a liquid medium which comprises subjecting a pulp of the liquid medium and the finely divided solids to agitation in the presence of runaway extract.

9. The improvement in deflocculating colloidal matter which comprises subjecting a pulp containing the colloidal matter to agitation in the presence of runaway extract.

10. The method of removing colloidal matter from a pulp containing the same which comprises agitating the pulp in the presence of runaway extract and thereby deflocculating the colloidal matter to a desired extent, and removing the deflocculated colloidal matter to a desired extent from the pulp.

11. The method of deflocculating and removing colloidal matter from a mineral pulp containing the same which comprises agitating the mineral pulp in the presence of runaway extract and thereby deflocculating the colloidal matter to a desired extent, and separating the deflocculated colloidal matter to a desired extent from the pulp.

12. The method of improving the physical condition of minerals associated with colloidal matter in a mineral pulp which comprises agitating the mineral pulp in the presence of runaway extract and thereby deflocculating to a desired extent the colloidal matter in the mineral pulp, and subjecting the mineral pulp to sedimentation and decantation in the course of which the deflocculated colloidal matter is removed to a desired extent from the mineral pulp.

13. The improvement in promoting the deflocculation of finely divided solids in a liquid medium which comprises attaining a deflocculating condition by adding colloidal runaway extract.

14. The improvement in promoting the deflocculation of finely divided solids in a liquid medium which comprises maintaining a deflocculating condition by means of adding colloidal runaway extract.

15. The improvement in promoting the deflocculation of finely divided solids in a liquid medium which comprises blunging a mixture of the finely divided solids and the liquid medium in the presence of the colloidal runaway extract, and maintaining the deflocculated condition.

16. The method of deflocculating and removing colloidal matter from a mineral product containing the same which comprises treating the mineral pulp with a colloidal runaway extract and thereby deflocculating the colloidal matter, maintaining the deflocculated condition and separating the deflocculated colloidal matter from the mineral pulp by decantation.

17. The method of improving the physical condition of minerals associated with colloidal matter in a mineral pulp which comprises treating the mineral pulp with a colloidal runaway extract and thereby deflocculating to a desired extent the colloidal matter in the mineral pulp, maintaining the deflocculated condition and removing the deflocculated colloidal matter to a desired extent from the mineral pulp by a decantation operation.

18. The improvement in producing the suspension of finely divided solids in a liquid medium which comprises subjecting the pulp of the liquid medium and the finely divided solids to agitation in the presence of colloidal runaway extract and maintaining the deflocculated condition of the finely divided solids.

19. The improvement in deflocculating colloidal matter which comprises subjecting a pulp containing the colloidal matter to agitation in the presence of colloidal runaway extract and maintaining the deflocculated condition of the colloidal matter.

20. The method of removing colloidal matter from a pulp containing the same which comprises agitating the pulp in the presence of colloidal runaway extract and thereby deflocculating the colloidal matter to a desired extent, maintaining the deflocculated condition of the colloidal matter and removing the deflocculated colloidal matter to a desired extent from the pulp.

21. The method of deflocculating and removing colloidal matter from the mineral pulp containing the same which comprises agitating the mineral pulp in the presence of colloidal runaway extract and thereby deflocculating the colloidal matter to a desired extent, maintaining the deflocculated condition of the colloidal matter and separating the deflocculated colloidal matter to a desired extent from the pulp.

22. The method of improving the physical conditions of minerals associated with colloidal matter in a mineral pulp which comprises agitating the mineral pulp in the presence of colloidal runaway extract and thereby deflocculating to a desired extent the colloidal matter in the mineral pulp, maintaining the deflocculated condition of the colloidal matter in the pulp and subjecting the mineral pulp to sedimentation and decantation in the course of which the deflocculated colloidal matter is removed to a desired extent from the mineral pulp.

In testimony whereof I affix my signature.

WALTER O. BORCHERDT.